(12) United States Patent
Chang et al.

(10) Patent No.: US 7,248,863 B2
(45) Date of Patent: Jul. 24, 2007

(54) ALERT-ME MANAGEMENT SYSTEM FOR TELECOMMUNICATIONS INFRASTRUCTURE AND METHOD OF OPERATION THEREOF

(75) Inventors: Yuh-Jye Chang, Bridgewater, NJ (US); Harsha S. Nagesh, Berkeley Heights, NJ (US); Viswanath Poosala, Middlesex, NJ (US); Anurag Srivastava, Roselle, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 254 days.

(21) Appl. No.: 10/819,585

(22) Filed: Apr. 7, 2004

(65) Prior Publication Data

US 2005/0239513 A1    Oct. 27, 2005

(51) Int. Cl.
*H04Q 7/20* (2006.01)
(52) U.S. Cl. ................. 455/415; 455/414.1; 455/412.2
(58) Field of Classification Search ................. 455/403, 455/404.1, 412.1, 412.2, 414.1, 415, 417, 455/422.1, 445; 379/201.01, 211.01, 211.02, 379/220.01
See application file for complete search history.

(56) References Cited

U.S. PATENT DOCUMENTS

| | | | | |
|---|---|---|---|---|
| 5,535,431 A | * | 7/1996 | Grube et al. ................. | 455/411 |
| 6,032,023 A | * | 2/2000 | Foladare et al. ............ | 340/7.22 |
| 6,385,303 B1 | * | 5/2002 | Peterson et al. ............ | 379/67.1 |
| 6,473,615 B1 | * | 10/2002 | Theppasandra et al. ..... | 455/445 |
| 6,573,825 B1 | * | 6/2003 | Okano ........................ | 340/7.51 |
| 6,804,509 B1 | * | 10/2004 | Okon et al. .............. | 455/414.1 |
| 2002/0150227 A1 | * | 10/2002 | Abraham ................ | 379/218.02 |
| 2002/0193119 A1 | * | 12/2002 | Goss et al. .................. | 455/453 |
| 2004/0002329 A1 | * | 1/2004 | Bhatia et al. ............. | 455/422.1 |

OTHER PUBLICATIONS

Lozinski; Parlay/OSA—A New Way to Create Wireless Services; "IEC Mobile Wireless Data," May 15, 2003, revised Jun. 1, 2003; www.parlay.org.

* cited by examiner

*Primary Examiner*—Jean Gelin

(57) ABSTRACT

An alert-me management system for a telecommunications infrastructure and a method of providing an alert-me service. In one embodiment, the system includes: (1) distributed alert-me request servers configured to receive and aggregate alert-me requests pertaining to uniquely identified wireless terminals from calling parties and (2) an alert-me service manager configured to receive the alert-me requests from the distributed alert-me request servers, further aggregate the alert-me requests into a table based on the uniquely identified wireless terminals, generate status checks for the uniquely identified wireless terminals and respond to the distributed alert-me request servers with positive alert-me indications to prompt the distributed alert-me request servers to generate alerts to the calling parties.

21 Claims, 2 Drawing Sheets

ALERT-ME MANAGEMENT SYSTEM FOR TELECOMMUNICATIONS INFRASTRUCTURE AND METHOD OF OPERATION THEREOF

TECHNICAL FIELD OF THE INVENTION

The present invention is directed, in general, to telecommunications infrastructures and, more specifically, to an alert-me management system for a telecommunications infrastructure and a method of providing an alert-me service.

BACKGROUND OF THE INVENTION

Telecommunications has exploded over the last 20 years. New companies, technologies and services are being introduced almost faster than the consumer can take advantage of them. Nevertheless, the public's thirst for the next new thing continues to spur rapid product and service development.

Leading the charge for innovation and change is wireless telecommunications. Only a few years ago, users were content with small, lightweight cellphones that allowed them to keep in touch in urban areas, even though voice quality was less than desirable. Now, users want their wireless phones to do much more. They want service areas to have no bounds. They want digital clarity. They want distinctive ringtones and designer faceplates. But, most of all, they want services that expand the utility and flexibility of their wireless phones.

Just one of those services, but a quite useful one, is "alert-me," which is broadly classified as an availability and reachability service. The motivation for alert-me arose from the frustration felt by one user (sometimes more specifically referred to as a "calling party") trying to reach another user by telephone only to find that he is temporarily unreachable. In the wireless world, this can indicate that his wireless terminal is out of range of a base station or simply turned off and therefore unable to communicate. Alert-me allows the calling party to request that he be alerted when the party he wishes to call becomes reachable (e.g., returns to within range of a base station). Conventionally, alert-me alerts the calling party by transmitting a text message to him. Upon receiving the text message, the calling party can place his call with an expectation of being successful.

Unfortunately, two technical barriers stand in the way of a widespread adoption of "alert me." The first is that many different and varied wireless infrastructures are in place in the world today. Any large-scale alert-me service would have to work with all of the wireless infrastructures that underlie it, which poses a substantial design, implementation and operational challenge. In fact, many wireless services that have been proposed or introduced but not offered widely suffer from the same challenge.

One significant effort underway to support the rapid development and deployment of new services is called Parlay/OSA (see, www.parlay.org). Parlay/OSA (OSA stands for "Open Systems Architecture") aims to do for telecommunications infrastructures what MacOS, Unix, Linux, Windows and countless other sophisticated operating systems have done for computers: provide a device-independent platform and standard application programming interface (API) for applications such as one that provides an alert-me service. Like advanced operating systems for computers, Parlay provides a way for applications to register themselves securely, pass commands, parameters and data to the underlying infrastructure and retrieve status indicators and data from the infrastructure. Parlay appears to be an effective way to address the first of the two barriers noted above.

Unfortunately, the second barrier remains. Ascertaining where a wireless terminal is physically located within a wireless infrastructure or if the terminal is even reachable consumes considerable network time and bandwidth (i.e., resources). Any application or service wishing to locate a wireless terminal must generate, from the server on which it is executing, a status check on for the location of the particular terminal. That status check must traverse the underlying infrastructure and arrive eventually at the Home Location Register (HLR) corresponding to the wireless terminal in question. In the case of "alert me," status checks are often repeatedly retransmitted (a process called "polling") until the HLR indicates that the terminal is reachable. Only then can the calling party be alerted.

It is apparent that as the alert-me service increases in scale, the number of alert-me requests coming from the calling parties and the constant status check polling of the various HLRs will overwhelm the server and place a significant strain on the resources of the underlying wireless infrastructure. What is needed in the art is an improved alert-me management system and a method of providing an alert-me service.

SUMMARY OF THE INVENTION

To address the above-discussed deficiencies of the prior art, the present invention introduces the broad concept of dividing the burden of receiving and responding to alert-me requests among distributed servers and centralizing the job of polling the wireless infrastructure to reduce the load on wireless infrastructure resources. The result is a scalable system and method that is more efficient than prior art architectures.

In one aspect, the present invention provides an alert-me management system for a telecommunications infrastructure. In one embodiment, the system includes: (1) distributed (either physically or logically) alert-me request servers configured to receive and aggregate alert-me requests pertaining to uniquely identified wireless terminals from calling parties and (2) an alert-me service manager (logically centralized) configured to receive the alert-me requests from the distributed alert-me request servers, further aggregate the alert-me requests into a table based on the uniquely identified wireless terminals, generate status checks for the uniquely identified wireless terminals and respond to the distributed alert-me request servers with positive alert-me indications to prompt the distributed alert-me request servers to generate alerts to the calling parties.

In another aspect, the present invention provides a method of providing an alert-me service. In one embodiment, the method includes: (1) receiving and aggregating alert-me requests pertaining to uniquely identified wireless terminals from calling parties in distributed alert-me request servers, (2) receiving the alert-me requests from the distributed alert-me request servers, (3) further aggregating the alert-me requests into a table based on the uniquely identified wireless terminals, (4) generating status checks for the uniquely identified wireless terminals and (5) responding to the distributed alert-me request servers with positive alert-me indications to prompt the distributed alert-me request servers to generate alerts to the calling parties.

In yet another aspect, the present invention provides an alert-me service manager. In one embodiment, the alert-me service manager includes: (1) an open systems architecture application programming interface that provides an interface to the wireless base stations for telecommunications applications and (2) an alert-me service processor that receives aggregated alert-me requests from distributed alert-me request servers, further aggregates the alert-me requests based on the uniquely identified wireless terminals, transmits status checks for the uniquely identified wireless terminals to the wireless network via the application programming interface and responds to the distributed alert-me request servers with positive alert-me indications to prompt the distributed alert-me request servers to generate alerts to the calling parties.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
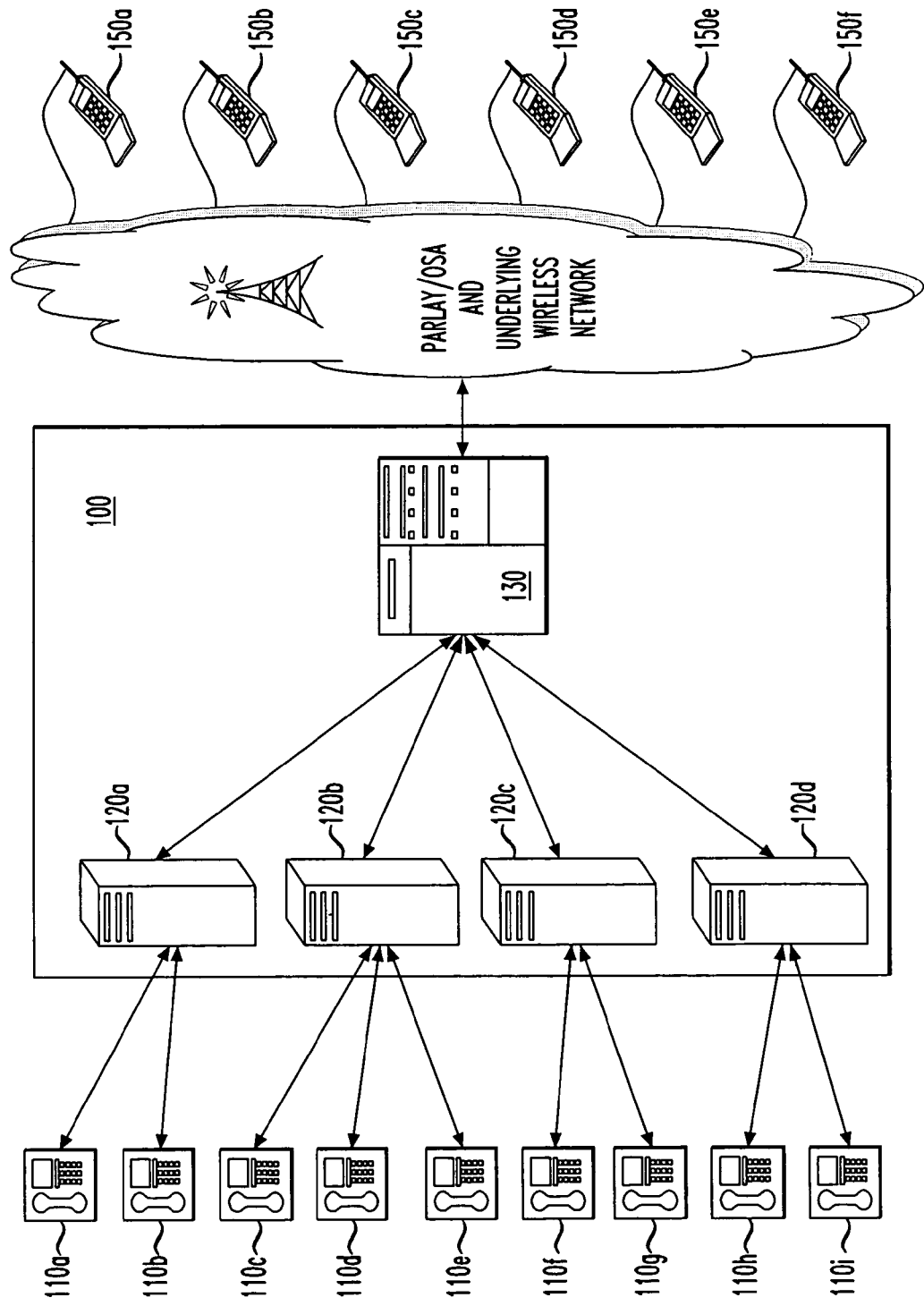
FIG. 1 illustrates a highly schematic representation of a wireless telecommunications infrastructure that contains an alert-me management system constructed according to the principles of the present invention.

Referring initially to a FIG. 1, illustrated is a highly schematic representation of a wireless telecommunications infrastructure that contains an alert-me management system, generally designated 100, constructed according to the principles of the present invention. Those skilled in the pertinent art understand that wide varieties of wireless telecommunications infrastructures exist today, and that an even wider variety is likely to exist in the future. Therefore, the infrastructure is merely an example provided for the purpose of showing how the alert-me management system 100 may operate.

The infrastructure includes a wireless network 140 illustrated in the form of a cloud, but that includes conventional wireless base stations (one of which is shown in the cloud but not referenced), switches and the like. The wireless network 100 has an OSA API, which may be a Parlay/OSA API. The API provides an interface to the wireless base stations for telecommunications applications.

The infrastructure further includes a plurality of telephone sets 110a-110i. In the illustrated embodiment, the telephone sets 110a-110i are wireless telephones capable of displaying a text message. However, the broad scope of the present invention is not limited to the type of telephone set that issues an alert-me request.

The telephone sets 110a-110i are coupled to the of the alert-me management system 100. More specifically, the telephone sets 110a-110i are coupled to corresponding distributed alert-me request servers (ARSs) 120a-120d of the alert-me management system 100. The physical or logical location of the telephone sets 110a-110i may determine how they are coupled to the distributed ARSs 120a-120d. For example, the telephone set 110a is illustrated as being coupled to the distributed ARS 120a perhaps because they share the same central office, service provider or sub-network.

The distributed ARSs 120a-120d receive and aggregate alert-me requests from the various telephone sets 110a-110i by executing a small, or "servlet," application in the illustrated embodiment. As stated above, users associated with the telephone sets 110a-110i originate the alert-me requests because they have tried unsuccessfully to reach a user whose wireless terminal is unreachable. Each alert-me request therefore relates to the uniquely identified telephone set that originated it and the uniquely identified wireless terminal to which it is directed. In the illustrated embodiment, the telephone numbers of the originating telephone set and wireless terminal provide their unique identification.

An alert-me service manager (ASM) 130 of the alert-me management system 100 receives the alert-me requests from the distributed ARSs 120a-120d. The ASM 130 further aggregates the alert-me requests into a table (defined broadly to include all appropriate data structures) based on the uniquely identified wireless terminals. The form and function of an exemplary table of alert-me requests will be discussed in greater detail below.

The ASM 130 is coupled to the underlying wireless network 140. The wireless network 140 is intermittently coupled to a plurality of wireless terminals 150a-150f. The API allows an alert-me service processor in the ASM 130 to, among other things, register its alert-me service, transmit status checks pertaining to one or more of the wireless terminals 150a-150f and receive status information thereon. The status information may take the form of negative or positive alert-me indications.

When the ASM 130 receives a positive alert-me indication on a particular wireless terminal (e.g., the wireless terminal 150d) indicating that the particular terminal is now reachable, the ASM 130 sends the indication to one or more of the distributed ARSs 120a-120d. The one or more of the distributed ARSs 120a-120d then send an alert to the originating telephone sets of the calling parties (e.g., the telephone set 10b). As stated previously, that alert may take the form of a text message displayed on the telephone set.

The ASM 130 in the illustrated embodiment uses a table and timestamps to determine when and where to transmit status checks. Table 1, below, gives one example of a hash table suitable for containing entries pertaining to alert-me requests.

Table 1 contains four columns. The first column contains an entry number and is included primarily to make Table 1 more readable. The second column contains a unique identifier for each wireless terminal for which a calling party has generated an alert-me request and is the key from which Table 1 is hashed. The third column contains a unique identifier for each telephone set that originated an alert-me request for particular wireless terminal. The fourth column contains a timestamp pertaining to the most recent status check for that wireless terminal. The timestamp, while not indispensable, assists in moderating any polling of wireless terminals that may take place and therefore can greatly reduce the load on wireless infrastructure resources.

Those skilled in the pertinent art will recognize that the wireless network need not rely on polling to ascertain the reachability of wireless terminals. Instead, the wireless network may used a trigger-based mechanism wherein a trigger is automatically set when a wireless terminal becomes reachable. Triggers are therefore analogous to interrupts in a computer system. The present invention is not limited to with respect to how the wireless network learns of the reachability of its wireless terminals.

TABLE 1

Hash Table for Alert-me Requests

| Entry Number | Wireless Terminal | Originating Telephone Set | Last Status Check Sent |
| --- | --- | --- | --- |
| 1 | 218-555-1826 | 218-555-5502 | 09:23:02 |
| 2 | 218-555-2323 | 218-555-1590 | 09:23:05 |
|   |              | 218-555-8670 |          |
|   |              | 872-555-1521 |          |
| 3 | 503-555-3780 | 218-555-9009 | 09:23:10 |
|   |              | 218-555-1383 |          |
| 4 | 503-555-1119 | 503-555-2526 | 09:23:14 |
| 5 | 872-555-1253 | 872-555-0034 |          |
|   |              | 872-555-6500 |          |
| 6 | 901-555-4576 | 901-555-3929 | 09:23:16 |
|   |              | 901-555-2043 |          |
| 7 | 910-555-5858 | 910-555-1201 | 09:23:16 |
|   |              | 910-555-2523 |          |
|   |              | 910-555-8080 |          |
| 8 | 910-555-9720 | 910-555-1101 | 09:23:20 |
|   |              | 910-555-2901 |          |

The operation of Table 1 can now be described in more detail. Table 1 contains eight entries (column 1), signifying that eight wireless terminals are the subject of pending alert-me requests. Table 1 is sorted in ascending order by the unique telephone numbers of the wireless terminals (column 2). The ASM 130 occasionally generates status checks to determine whether the wireless terminals in column 2 are reachable. In the illustrated embodiment, the ASM 130 issues those status checks periodically based on a preprogrammed time interval, for example 10 seconds.

Assuming a 10-second time interval, and assuming that the current time is 09:23:17, the ASM 130 goes through Table 1 to determine which wireless terminals ought to be queried. More than 10 seconds has elapsed since entries 1 and 2 were last checked, so the ASM 130 generates a status check for those their corresponding wireless terminals. The ASM 130 further generates a status check for entry 5, since it is apparently new and has never before been status-checked.

Fewer than 10 seconds has elapsed since entries 3, 4 and 6-8 were last checked, so the ASM 130 does not generate a status check for their corresponding wireless terminals. This reduces the load on the wireless network 140.

Further, the ASM 130 has generated only three status checks (for entries 1, 2 and 5). However those three status checks cover a total of six alert-me requests (one for entry 1, three for entry 2 and two for entry 5). Were the alert-me requests not centralized in the ASM 130 of the present invention, the wireless network 140 would have to respond to six status checks instead of only three. The wireless network 140 has been relieved of three status checks.

It should be reiterated at this time that the API provides a uniform mechanism for transmitting the status checks to the underlying wireless network. Thus, the ASM 130 does not need to tailor its status checks to each wireless network with which it interacts. This allows a single alert-me service manager to transmit status checks to and receive status information from a wide variety of wireless networks concurrently.

It is now assumed that the wireless network 140 has responded with status information indicating that the wireless terminal for entry 2 has become reachable. In response, the ASM 130 generates positive alert-me indications for entry 2. Entry 2 is interesting because one of the originating telephone sets is located in an area code that is different from that of the wireless terminal.

Assuming that the telephone sets 110a and 110b generated the first two alert-me requests of entry 2 and that the telephone set 110h generated the third alert-me request of entry 2, the ASM 130 sends a positive alert-me indication to both the distributed ARS 120a and the distributed ARS 120d and then removes entries 1, 2 and 5 from the table. The positive alert-me indications prompt the distributed ARS 120a and the distributed ARS 120d to generate alerts to the calling parties via their respective telephone sets 110a, 110b, 110h.

It should be noted that since the distributed ARS 120a and the distributed ARS 120d are responsible for generating the alerts (e.g., text messages), the ASM 130 is relieved of that task and overhead, which lends scalability to the present invention.

Figure 2:
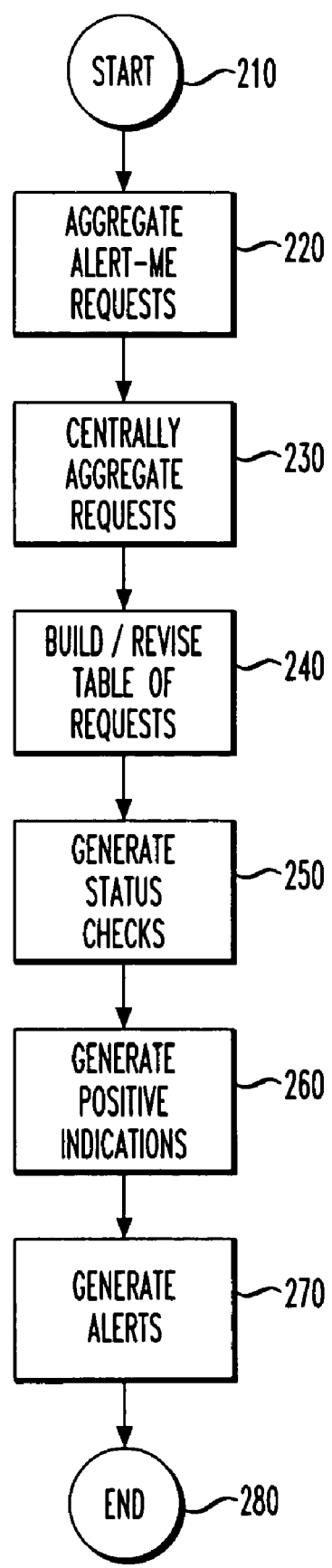
FIG. 2 illustrates a flow diagram of a method of providing an alert-me service carried out according to the principles of the present invention.

Turning now to FIG. 2, illustrated is a flow diagram of a method, generally designated 200, of providing an alert-me service carried out according to the principles of the present invention. The method 200 begins in a start step 210, when the alert-me service is registered with a particular wireless network.

The method 200 proceeds to a step 220 in which alert-me requests pertaining to uniquely identified wireless terminals are received and aggregated from calling parties in distributed ARSs. In a step 230, the alert-me requests from the distributed ARSs are centrally received into an alert-me service manager. In a step 240, the alert-me requests are further aggregated into a table based on the uniquely identified wireless terminals.

In a step 250, status checks are generated for the uniquely identified wireless terminals. In a step 260, the alert-me service manager responds to ones of the distributed ARSs with positive alert-me indications. The responses prompt the distributed ARSs to generate alerts to the calling parties in a step 270. The method 200 ends in an end step 280.

It should be apparent to one skilled in the pertinent art that the steps 220-270 may take place concurrently and/or in any order as the service operates. Thus, new alert-me requests filter through to the alert-me service manager and are added to the table, responses are generated and corresponding entries deleted from the table, and alerts are sent while status checks and new alert-me requests are received.

Although the present invention has been described in detail, those skilled in the art should understand that they can make various changes, substitutions and alterations herein without departing from the spirit and scope of the invention in its broadest form.

What is claimed is:

1. An alert-me management system for a telecommunications infrastructure, comprising:
    distributed alert-me request servers configured to receive and aggregate alert-me requests pertaining to uniquely identified wireless terminals from calling parties; and
    an alert-me service manager configured to receive said alert-me requests from said distributed alert-me request servers, further aggregate said alert-me requests based on said uniquely identified wireless terminals, generate status checks for said uniquely identified wireless terminals and respond to said distributed alert-me request servers with positive alert-me indications to prompt said distributed alert-me request servers to generate alerts to said calling parties.

2. The system as recited in claim 1 wherein said distributed alert-me request servers are web servers.

3. The system as recited in claim 1 wherein associated telephone numbers uniquely identify said uniquely identified wireless terminals.

4. The system as recited in claim 1 wherein said further aggregate includes aggregating said alert-me requests into a hash table keyed on telephone numbers associated with said uniquely identified wireless terminals.

5. The system as recited in claim 1 wherein said further aggregate includes aggregating said alert-me requests into a table containing timestamps of most recent status checks for each entry therein.

6. The system as recited in claim 5 wherein said alert-me service manager is configured to generate said status checks based on said timestamps.

7. The system as recited in claim 1 wherein said alerts comprise text messages.

8. A method of providing an alert-me service, comprising:
  receiving and aggregating alert-me requests pertaining to uniquely identified wireless terminals from calling parties in distributed alert-me request servers;
  receiving said alert-me requests from said distributed alert-me request servers;
  further aggregating said alert-me requests based on said uniquely identified wireless terminals;
  generating status checks for said uniquely identified wireless terminals; and
  responding to said distributed alert-me request servers with positive alert-me indications to prompt said distributed alert-me request servers to generate alerts to said calling parties.

9. The method as recited in claim 8 wherein said distributed alert-me request servers are web servers.

10. The method as recited in claim 8 wherein associated telephone numbers uniquely identify said uniquely identified wireless terminals.

11. The method as recited in claim 8 wherein said further aggregating includes aggregating said alert-me requests into a hash table keyed on telephone numbers associated with said uniquely identified wireless terminals.

12. The method as recited in claim 8 wherein said further aggregating includes aggregating said alert-me requests into a table containing timestamps of most recent status checks for each entry therein.

13. The method as recited in claim 12 wherein said generating is carried out based on said timestamps.

14. The method as recited in claim 8 wherein said alerts comprise text messages.

15. An alert-me service manager, comprising:
  an open systems architecture application programming interface that provides an interface to wireless base stations of a wireless network for telecommunications applications; and
  an alert-me service processor that receives said alert-me requests from distributed alert-me request servers that receive and aggregate alert-me requests pertaining to uniquely identified wireless terminals from calling parties, further aggregates said alert-me requests based on said uniquely identified wireless terminals, transmits status checks for said uniquely identified wireless terminals to said wireless network via said application programming interface and responds to said distributed alert-me request servers with positive alert-me indications to prompt said distributed alert-me request servers to generate alerts to said calling parties.

16. The alert-me service manager as recited in claim 15 wherein said distributed alert-me request servers are web servers.

17. The alert-me service manager as recited in claim 15 wherein associated telephone numbers uniquely identify said uniquely identified wireless terminals.

18. The alert-me service manager as recited in claim 15 wherein said further aggregates includes aggregating said alert-me requests into a hash table keyed on telephone numbers associated with said uniquely identified wireless terminals.

19. The alert-me service manager as recited in claim 15 wherein said further aggregates includes aggregating said alert-me requests into a table containing timestamps of most recent status checks for each entry therein.

20. The alert-me service manager as recited in claim 19 wherein said alert-me service manager is configured to generate said status checks based on said timestamps.

21. The alert-me service manager as recited in claim 15 wherein said alerts comprise text messages.

* * * * *